United States Patent
Rapeli

(10) Patent No.: US 6,731,242 B1
(45) Date of Patent: May 4, 2004

(54) METHOD OF CALCULATING THE POSITION OF A MOBILE RADIO STATION BASED ON SHORTEST PROPAGATION TIME

(75) Inventor: Juha Heikki Antero Rapeli, Oulu (FI)

(73) Assignee: Koninklijke Philips Electronics N.V., Eindhoven (NL)

( * ) Notice: Subject to any disclaimer, the term of this patent is extended or adjusted under 35 U.S.C. 154(b) by 369 days.

(21) Appl. No.: 09/656,127

(22) Filed: Sep. 6, 2000

(30) Foreign Application Priority Data

Sep. 7, 1999 (EP) .............................. 99402201

(51) Int. Cl.[7] ................................................ G01S 3/02
(52) U.S. Cl. ...................................... 342/450; 342/457
(58) Field of Search .............................. 342/450, 453, 342/457, 463; 455/456, 457

(56) References Cited

U.S. PATENT DOCUMENTS

| | | | | |
|---|---|---|---|---|
| 3,876,980 A | * | 4/1975 | Haemming et al. | ........ 340/146.1 BA |
| 5,526,357 A | * | 6/1996 | Jandrell | ...................... 370/95.2 |
| 5,797,097 A | * | 8/1998 | Roach et al. | ............... 455/456 |
| 6,125,275 A | * | 9/2000 | Comer | ....................... 455/426 |

FOREIGN PATENT DOCUMENTS

WO     WO9921028     4/1999     ............. G01S/5/14

OTHER PUBLICATIONS

By James J. Caffery, Jr. & Gordon L.Stuber; Overview of Radiolocation in CDMA Cellular Systems Published in IEEE Communications Magazine in Apr. 1998, pp. 38–45.

By Samuel C. Yang, "CDMA RF System Engineering" Artech House Publishers 1998 pp. 1–11.

Physical Channels and Mapping of Transport Channels onto Physical Channels (FDD); Published Jun. 1999. Pp. 14–15.

* cited by examiner

Primary Examiner—Dao Phan
(74) Attorney, Agent, or Firm—Jack D. Slobod

(57) ABSTRACT

In a location method based on distance measurements, the distance between a mobile station and a base station is measured by finding the one-way propagation time between the two radio stations. This one-way propagation time is obtained by sending a location signal and measuring its time of arrival. In order to mitigate inaccuracy due to use of measurements corresponding to reflected radio paths which are longer than direct radio paths, a method is proposed to ensure that the distance calculation will be done by using the first time of arrival of the location signal. The first time of arrival corresponds to a propagation through the shortest radio path, which is likely to be the direct path. The first time of arrival is determined by using a location signal which includes a plurality of identical messages, and by combining these messages on reception in order to obtain a signal of higher energy of which the shortest path is detected.

10 Claims, 3 Drawing Sheets

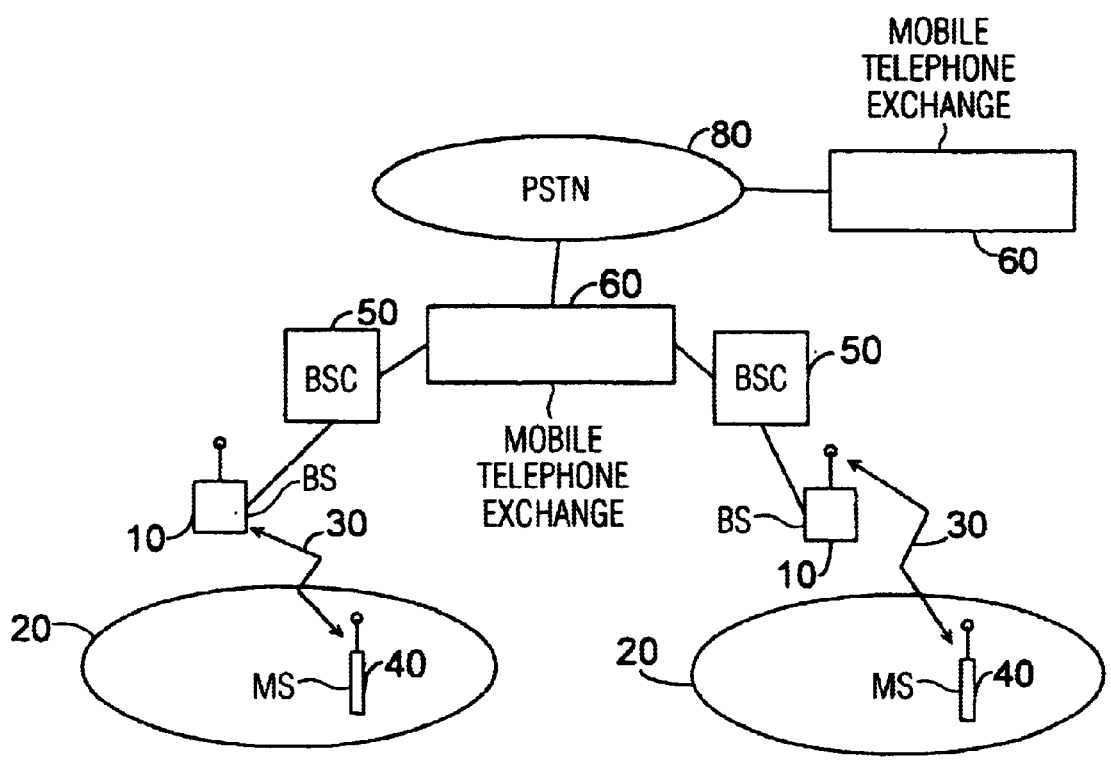
FIG.1
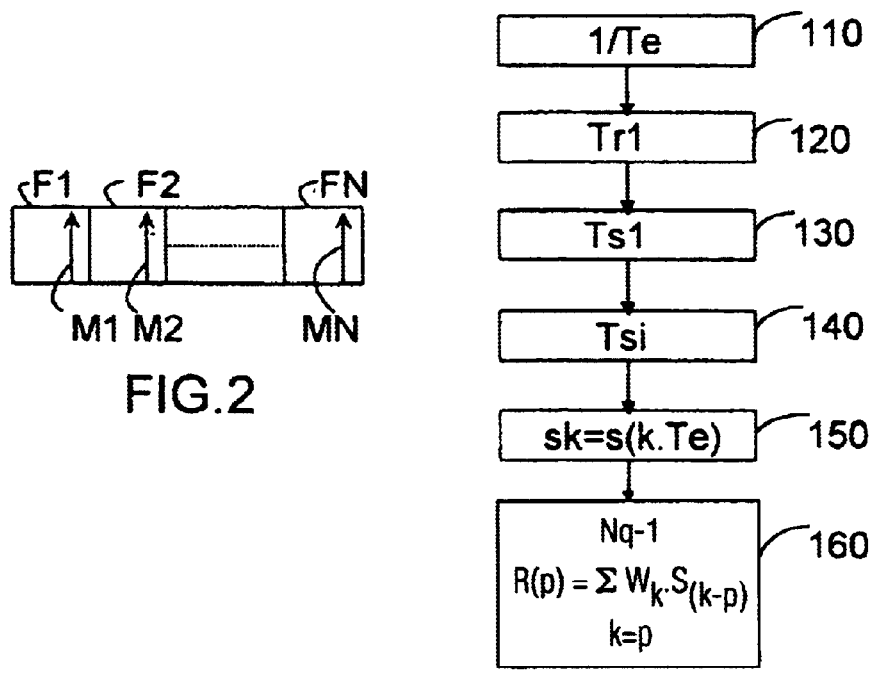
FIG.2
FIG.3

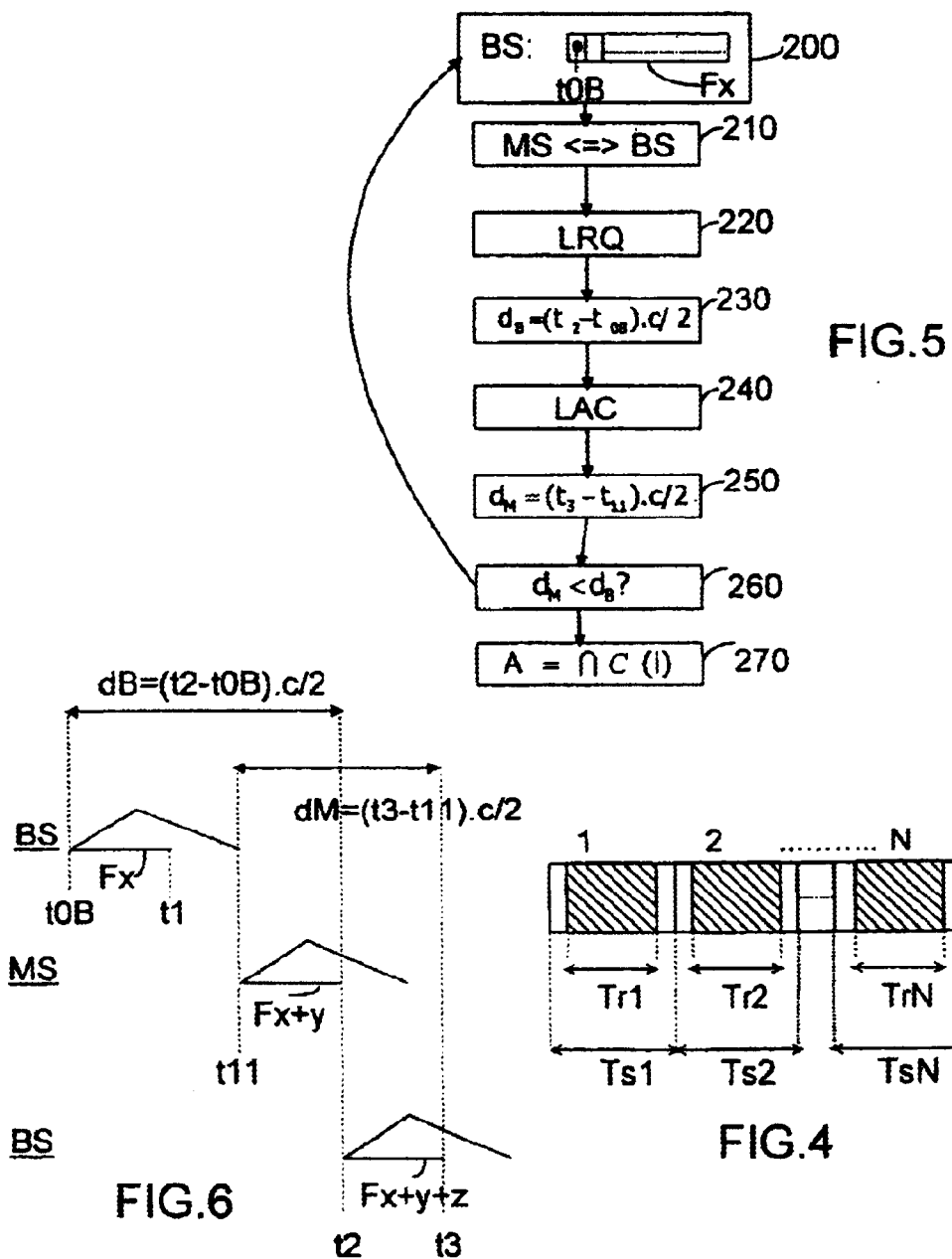

METHOD OF CALCULATING THE POSITION OF A MOBILE RADIO STATION BASED ON SHORTEST PROPAGATION TIME

FIELD OF THE INVENTION

The present invention relates to a method of calculating of a position of a first radio station intended to be connected to a second radio station, using measurements of a radio signal, called location signal, sent by one of the first and second radio stations, called emitting radio station, to the other of the first and second radio stations, called receiving radio station, and propagated to the receiving radio station along a plurality of radio paths including a shortest radio path.

It also relates to a communication network comprising a first radio station intended to communicate with a second radio station which may move relative to the first radio station, at least one of the first and second radio stations being configured to send a radio signal, called location signal, propagated to the other one of the first and second radio stations through a plurality of radio paths including a shortest path, and the other one of the first and second radio stations being configured for making measurements of the location signal and for calculating a position of the second radio station from the measurements.

It also relates to a radio station intended to be used in such a communication network.

BACKGROUND OF THE INVENTION

Such positioning methods are notably described in the article "Overview of Radiolocation in CDMA Cellular Systems" from James J. Caffery, Jr. and Gordon L. Stüber published in IEEE Communications Magazine in April 1998. A position can be derived from measurements of signals, for example propagation time. The problem is that the signals which are detected at the receiving station and which are used for such measurements often correspond to reflected radio paths which are longer than direct radio paths. This results in an inaccurate position.

SUMMARY OF THE INVENTION

One of the aims of the invention is to propose a method of calculation of a position of radio station with improved accuracy.

This object is achieved with the method described in claim 1 of the present application. As the energy of received signals is increased, the level of the signal received via the direct path is sufficiently high for this signal to be detected by the receiver.

BRIEF DESCRIPTION OF THE DRAWINGS

The accompanying drawings illustrate preferred embodiments of the invention and together with the description serve to explain the principles of the invention.

FIG. 1 illustrates an exemplary radio communication network according to the invention.

FIG. 2 gives a first example of a location signal according to the invention.

FIG. 3 is a diagram indicating the steps of a method according to the invention for calculation of first time of arrival of location signals.

FIG. 4 is a time-related sequence of samples stored by the receiving radio station in view of reprocessing.

FIG. 5 is a diagram indicating the steps of a first embodiment of a location method based on the time of arrival according to the calculation method described in FIG. 4.

FIG. 6 is time diagram illustrating the first embodiment of a location method according to the invention.

DESCRIPTION OF EXEMPLARY EMBODIMENTS

Figure 7:
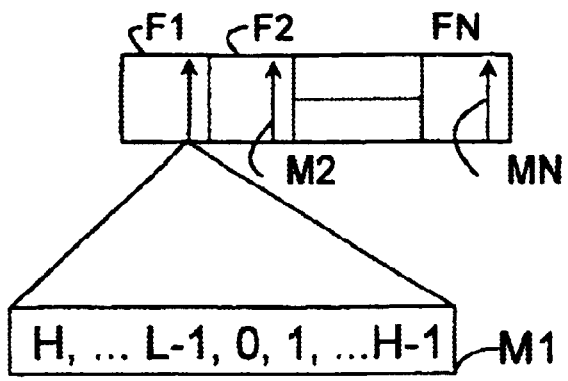
FIG. 7 is a second example of a location signal according to the invention.

An example of a radio communication network according to the invention is represented in FIG. 1. It comprises several base stations 10. Each base station 10 is covering a specific cell 20 and is intended to communicate via radio links 30 with mobile stations 40 located in this specific cell 20. Each base station is connected through a base station controller 50 to a mobile telephone exchange 60. One base station controller 50 may connect several base stations 10, and one mobile telephone exchange 60 may connect several base station controllers 50. Mobile telephone exchanges 60 are interconnected via e.g. the public switched telephone network 80. Cells 20 are overlapping, so that a mobile station associated to one cell is able to detect signals of several adjacent cells in different directions. This feature serves, on the one hand, the purpose of moving from one cell to another without interruption of communications, and on the other hand, to facilitate the location of the mobile station by measuring the distance from it to a plurality of base stations.

The radio communication network, which will be described now, is a mobile phone spread spectrum communication network. But the invention also applies to radio communication networks having other applications and/or using other multiple access techniques. For more details relating to the spread spectrum technique, reference may be made to the book "CDMA RF System Engineering" by Samuel C. Yang, Artech House Publishers 1998 pages 1 to 11.

The invention relates to a location method based on distance measurements. In such methods the distance between a mobile station and a base station is measured by finding the one-way propagation time between the two radio stations. Geometrically this provides a circle, on which the mobile station must lie, which circle is centered at the base station. By using at least three base stations it is possible to locate the mobile station at the intersection of the circles.

The one-way propagation time between a mobile and a base station is generally found by sending at least one location signal from one of the radio stations to the other, and measuring the time of arrival of said location signal with respect to a point of time known from the two stations. The invention proposes a method to ensure that the distance calculation will be done by using the first time of arrival of the location signal, said first time of arrival corresponding to a propagation by the shortest radio path (which is likely to be the direct path). A method of determining the first time of arrival of a location signal will now be described with reference to FIGS. 2, 3 and 4.

FIG. 2 gives a representation of a preferred embodiment of the location signal according to the invention. This location signal is made up of N identical messages $M_i$ (i=1, . . . ,N) sent in identical positions in N subsequent frames $F_i$.

A frame is a format in which data to be transmitted are split up by the data link layer (the data link layer is the second layer of the OSI seven layers). Frames are transmitted in sequence and on the receiving end acknowledgment frames are generated. The time frame to be used here is defined by the radio communication network. The essential feature of this frame is that specific time slots are defined for users to send requests. The messages $M_i$ are sent in such time slots.

For example, for a mobile phone spread spectrum communication network complying with the Technical Specification TS 25.211 (v2.1.0) on "Physical channels and mapping of Transport channels onto physical channels (FDD) defined by the 3GPP, the FAUSCH structure (described in sections 5.2.2.1.4 and 5.2.2.1.5) is advantageously used for transmission of the messages $M_i$.

A message $M_i$ is a specific spreading code used for one bit and comprising L chips: $M_i = \{C_0, \ldots, C_{L-1}\}$.

On the receiving end the base station uses all the N messages to resolve the timing of the location signal. FIG. 3 gives a block diagram of such a timing resolution. It comprises the following steps:

At step 110, the receiver samples received signals at sampling rate $1/T_e$.

At step 120, the receiver detects one propagated component of the first message $M_1$ of a location request. This detection is made by correlating the received samples and the specific spreading code. The detected component may be a reflected component of the location signal. The time slot $Tr_1$, during which this detected component was received, is called reception time slot.

At step 130, the receiver stores all the samples received in a time slot $Ts_1$ surrounding said reception time slot $Tr_1$. The size of this surrounding time slot $Ts_1$ is chosen so that it contains all the propagated components of the first message $M_1$ of the location signal.

After detection of the first message the receiver recognizes that N−1 identical messages will be sent in identical positions in N−1 subsequent frames. At step 140, it also stores the q samples received in the (N−1) time slots $Ts_i$ (i=2, ..., N) which surround the (N−1) reception time slots $Tr_i$ (i=2, ..., N) of the corresponding (N−1) components of the (N−1) subsequent messages $M_i$ (i=2, ..., N).

At step 150, all the stored samples are concatenated in a time-related sequence starting at $T_0$. Samples of this time-related sequence are designated by $s_k = s(k \cdot T_e)$, where $k = \{1, \ldots, N \cdot q\}$. FIG. 4 gives a representation of this time-related sequence.

At step 160, this stored sequence is reprocessed by the receiver in order to detect the component of the messages $M_1$ to $M_N$ which was transmitted via the shortest radio path (these components are the components arriving earliest). This reprocessing consists of correlating the stored sequence and a pattern related to the specific spreading code. Said pattern is defined as follows for $k = \{0, \ldots, Nq-1\}$:

$$w_k = w(k.T_c) = \begin{cases} C_\beta & \text{for } k = \alpha q + \beta \text{ where } \alpha = \{0, \ldots, N-1\} \text{ and } \beta = \{0, \ldots, L-1\} \\ 0 & \text{for } k \neq \alpha q + \beta \end{cases}$$

The correlation function R is defined as follows:

$$R(p) = \sum_{k=p}^{Nq-1} w_k \cdot s_{(k-p)}$$

R(p) is calculated for p=0 to q. The value of p corresponding to the first maximum of R(p) gives the relative time arrival $TOA = T_0 + p \cdot T_c$ of the first message $M_1$ transmitted via the shortest path.

The shortest path which could be undetected at step 120 because its energy was too low, is detected at step 160, because calculating the correlation function over all the repeated messages comes to apply an additional processing gain to the signal, said processing gain being defined as $G_{dB} = 10 \cdot \log(N)$. It is advantageous to choose for N a number from the binary set of 4, 8, 16 or 32.

In the above-described embodiment all the N identical messages were sent at the same position in the frame. It is also possible to send the N identical messages at different positions. In such a case it is necessary to repeat steps 120 and 130 for each frame, instead of performing step 140.

A first embodiment of a location method using the above-described method of determining a time of arrival will now be described with reference to FIGS. 5, 6 and 7. FIG. 5 is a diagram showing the steps of this first embodiment. It will be explained by referring to the time diagram of FIG. 6. It should be noted that the times indicated in FIG. 6 are relative times related to the beginning of frames.

At step 200, the base station sends a CDMA pilot signal at reference time $t_{0B}$ in frame $F_X$ (where X is an integer). At step 210 the mobile station 40 synchronizes with a received CDMA pilot. The mobile station 40 may synchronize with a direct component (received at relative time $t_1$) or with a reflected component of the received pilot signal (received at relative time $t_{11}$). FIG. 6 assumes that it is synchronized with a reflected component which is the most probable case. At step 220, the mobile station sends a location request signal LRQ at relative time $t_{11}$ in frame $F_{X+Y}$ (where Y is an integer) and in the N−1 subsequent frames. This location request signal matches the location signal represented on FIG. 2. At step 230, the base station 10 resolves the timing of this location request using the shortest radio path and elaborates a first distance $d_B$. In FIG. 6 the relative time of arrival of the shortest path is designated by relative time $t_2$, so that $d_B = (t_2 - t_{0B}) \cdot c/2$ where c is the speed of light. This distance measurement $d_B$ is half the roundtrip where the distance from base station to mobile station is measured along a possibly reflected path and the distance from the mobile station to the base station is measured along the direct path. Then, at step 240, the base station responds by sending another location signal (also matching the location signal of FIG. 2), called location acknowledgement signal LAC. This LAC signal is transmitted at relative time $t_2$ in frame $F_{X+Y+Z}$ (where Z is an integer) and in the N−1 subsequent frames. At step 250, the mobile station 40 receives the LAC signal, resolves the timing of this location acknowledgment using the shortest radio path and elaborates a second distance $d_M$ (on FIG. 6 the relative time of arrival of the shortest path is designated by $t_3$, so that $d_M = (t_3 - t_{11}) \cdot c/2$). This distance $d_M$ is half the roundtrip where both directions run along the direct path. Therefore, the distance $d_M$ is the best estimate.

The results $d_B$ and $d_M$ are then used and communicated appropriately, e.g. either or the two radio stations communicate the measured distances $d_M$ or $d_B$ to the other radio station, for elaboration of an evaluation of the reliability of measured distances and conclusion on a final reliable distance. An alternative of the first embodiment is described below, wherein the first resolved distance is communicated back to another radio station:

the base station sends the measured distance $d_B$ to the mobile station in the location acknowledgement signal LAC at step 240. FIG. 6 gives a representation of a location signal containing distance (or time) information. The distance (or time) information is inserted in the N repeated messages $M_i$ of the LAC signal by rotating the specific spreading code $\{C_0, \ldots, C_H, \ldots, C_{L-1}\}$ in such a way that the code starts from chips H to L−1 and then continues with chips 0 to H−1, where the time from chip H to L−1 corresponds to the distance (or time) information to be transmitted.

and at step 260, the mobile station compares the two distances $d_B$ and $d_M$ and makes a decision of reliability:

if $d_M$ is essentially equal to $d_B$, then the mobile station is probably synchronized with a direct path component of the pilot signal, and the values $d_B$ and $d_M$ are reliable, if the mobile station has measured a smaller distance than the base station ($d_M < d_B$), then the mobile station is probably synchronized with a reflected path component of the pilot signal, and the measurement of the mobile station ($d_M$) is more probably the correct one, if the mobile station has measured a longer distance than the base station ($d_M > d_B$), then either or the two measurements are erroneous. If the difference between the two distances is significant, the results are rejected and the process restarts at step 200.

In a general way on one or both of the above-mentioned distances $d_B$ or $d_M$ are relied on and accordingly, only the steps necessary to obtain these values are carried out.

When a reliable distance d(i) has been obtained, the mobile station repeats the above steps for a set of other available base stations. With each base station a reliable distance is elaborated. Each distance d(i) defines a locus L(i) on which the mobile station must lie. The point at which the loci L(i) from multiple measurements intersect defines the position of the mobile station. In order to avoid ambiguity in the position of the mobile station, distance measurements must be performed with at least three base stations. Finally, at step 270, the position of the mobile station is determined from all the reliable distance measurements. In a first alternative the position of the mobile station is determined by the mobile station itself and is then transmitted to a location service center which may be located at a base station or at any other entity of the radio communication network. In a second alternative the position of the mobile station is determined at the location service center from received distance measurements.

In this first embodiment the length of the frames needs to be at least twice the longest foreseen one-way propagation time between the base and the mobile stations.

Figure 8:
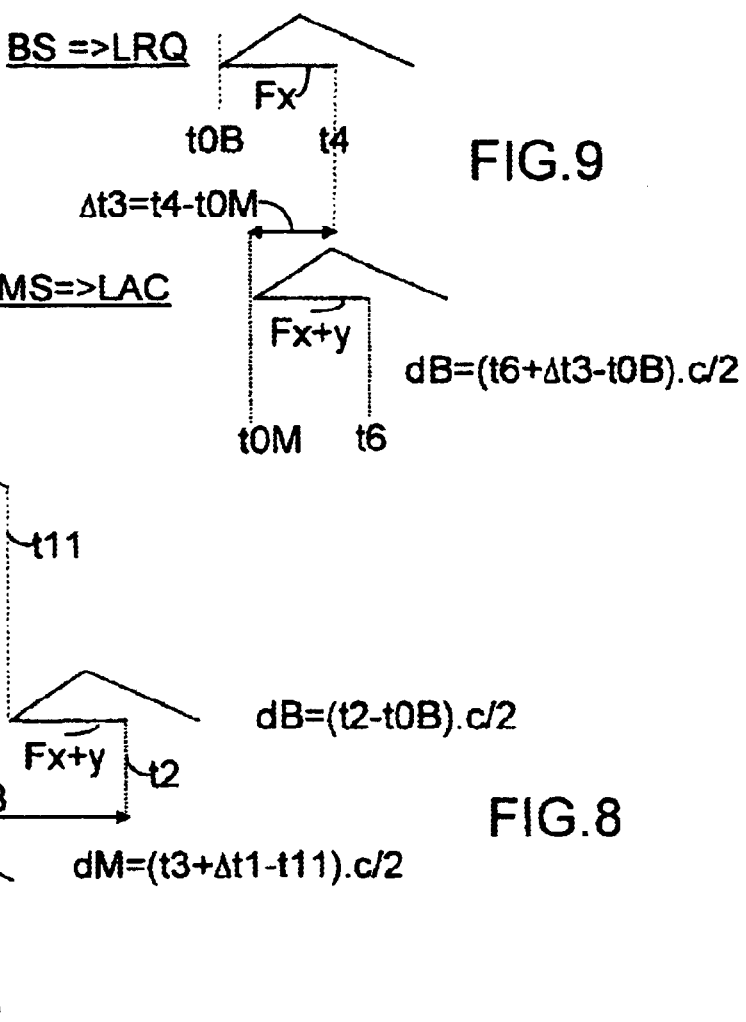
FIG. 8 is a time diagram illustrating a second embodiment of a location method according to the invention.

A second embodiment will now be described by referring to FIG. 8, in which the frames may be shorter. In this embodiment the base station sends the LAC signal to the mobile station at relative time $t_{0B}$, but communicates the relative time difference $\Delta t_1 = t_2 - t_{0B}$ for example by rotating the chips of the messages as indicated in FIG. 7. This relative time difference $\Delta t_1$ is taken into account to elaborate the distance $d_M$ at step 250: $d_M = (t_3 + \Delta t_1 - t_{11}) \cdot c/2$.

Figure 9:
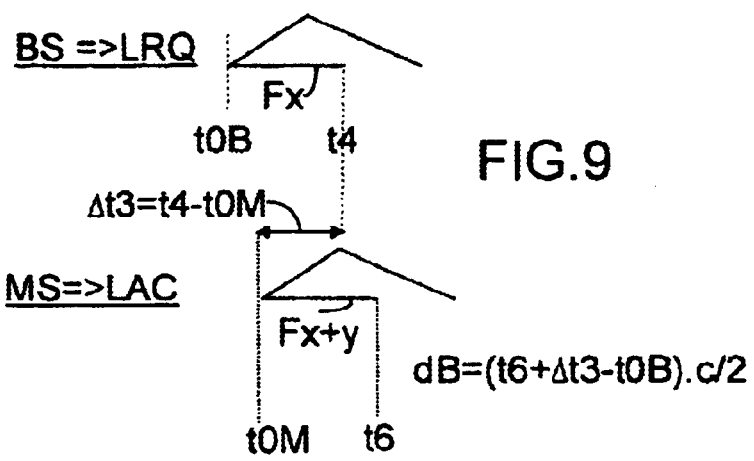
FIG. 9 is a time diagram illustrating a third embodiment of a location method according to the invention.

In these first and second embodiments the mobile station initiates the operation. This is not restrictive: a third embodiment will now be described with reference to FIG. 9, where the base station initiate the operations.

In this third embodiment the base station sends a location request signal to the mobile station at relative reference time $t_{0B}$. The mobile station receives said signal over a plurality of radio paths and resolves the relative first time of arrival $t_4$ of said signal. Then the mobile station sends a location acknowledgment signal to the base station at relative reference time $t_{OM}$ inserting, via chip rotation, the time difference $\Delta t_3 = t_4 - t_{OM}$ in the repeated messages. The base station receives said signal via a plurality of radio paths and resolves the relative first time of arrival $t_6$ of said signal. The desired distance dB is given by: $d_B = (t_6 + \Delta t_3 - t_{0B}) \cdot c/2$.

Embodiments where the base station initiates the operations are particularly advantageous when distance (or time) information is transmitted via chip rotation inside the one-bit messages. In fact this method implies quite heavy signal processing: the receiver has to scan the received signal over all rotation values and identify the rotation value what corresponds to the maximum of the correlation. It is better that the base station performs such heavy processing.

The method described above is suitable for measuring the distance between two radio stations either using the propagation in one direction or using the propagation back and forth. The method can also be changed during the operations in such a way that the one-way delay measurement with chip rotation is used when the distance is so long that the sequential transmissions would extend beyond the time of the frame.

Finally, it should be noted that the method of calculating distances describe above may also be used with other methods of calculating the time of arrival than the one described herewith reference to FIG. 3.

What is claimed is:

1. A method of calculating a position of a first radio station intended to be connected to a second radio station, said calculating method using measurements of a radio signal, called location signal, sent by one of said first and second radio stations, called emitting radio station, to the other of said first and second radio stations, called receiving radio station, and propagated to said receiving radio station along a plurality of radio paths including a shortest radio path, wherein said location signal includes N identical messages, where N is greater than or equal to 4, combined by said receiving radio station in order to obtain a signal of higher energy than that of the received identical messages, of which the shortest path is detected, said measurements of the location signal being based on said shortest path.

2. The method of calculating a position of a first radio station as claimed in claim 1, for use in a spread spectrum communication network, wherein said messages sent by the emitting station are coded with a specific spreading code, and the method further comprises:

sampling received signals, detecting a first message of a received location signal, said first message being received in a time slot called reception time slot, first storing samples received in a time slot surrounding said reception time slot, second storing samples received in time slots surrounding the reception time slots of at least part of the repeated messages of said received locations signal, calculating a correlation function of said stored samples with a pattern related to said message, and detecting a first maximum of said correlation function.

3. The method of calculating of a position of a first radio station as claimed in claim 1, further comprising calculating a distance between said transmitting and receiving radio stations from a roundtrip transmission time between said radio stations, where said transmitting radio station sends a first location signal to said receiving radio station, and said receiving radio station determines a time of arrival of said first location signal when propagated via said shortest path, and responds by sending back a second location signal indicative of said time of arrival.

4. The method as claimed in claim 3, wherein said second location signal is indicative of said time of arrival in that chips of the identical messages of said second location signal are rotated with a value indicating said time of arrival.

5. The method as claimed in claim 3, wherein said second location signal is indicative of said time of arrival in which it is sent in a frame at a relative time indicating said time of arrival.

6. A communication network comprising a first radio station intended to communicate with a second radio station which may move with respect to said first radio station, at least one of said first and second radio stations comprising sending means to send a radio signal called location signal propagated to the other one of said first and second radio stations via a plurality of radio paths including a shortest path, and the other one of said radio stations comprising measuring means for making measurements of said location signal and calculating means for calculating a position of said second radio station from said measurements, wherein said location signal includes a plurality of identical messages, combined by the other one of said first and second radio stations in order to obtain a signal of higher energy than that of the received identical messages, of which the shortest path is detected, said measurements of the location signal being based on said shortest path.

7. The communication network as claimed in claim 6, wherein said transmitting station has encoding means for encoding said plurality of identical messages with a specific spreading code, and said receiving station has:

sampling means for sampling received signals, first detection means for detecting a first message of a received location signal, said first message being received in a time slot called reception time slot, first storage means for storing samples received in a time slot surrounding said reception time slot, second storage means for storing samples received in time slots surrounding the reception time slots of at least part of the repeated messages of said received location signal, processing means for calculating a correlation function of said stored samples with a pattern related to said message, and second detection means for detecting a first maximum of said correlation function.

8. The communication network as claimed in claim 6, wherein said transmitting radio station comprises distance calculation means for calculating a distance between said transmitting and receiving radio stations from a roundtrip transmission time between said radio stations, where said emitting radio station has sending means for sending a first location signal to said receiving radio station, and said receiving radio station has determining means for determining a time of arrival of said first location signal when propagated via said shortest path, and responding means for sending back a second location signal indicative of said time of arrival.

9. A radio station comprising sending means for sending a radio signal, called location signal, which may be propagated via a plurality of radio paths including a shortest path, measurements of said location signal being used for calculating a position of said radio station, wherein said location signal includes a plurality of identical messages, intended to be combined for obtaining a signal of higher energy than that of the received identical messages, from which the shortest path is detectable.

10. A radio station intended to receive location signals including a plurality of identical messages via a plurality of radio paths including a shortest path, said radio station comprising:

sampling means for sampling received signals, first detection means for detecting a first message of a received location signal, said first message being received in a time slot called reception time slot, first storage means for storing samples received in a time slot surrounding said reception time slot, second storage means for storing samples received in time slots surrounding the reception time slots of at least part of the repeated messages of said received location signal, processing means for calculating a correlation function of said stored samples with a pattern related to said message, second detection means for detecting a first maximum of said correlation function, said first maximum being used for distance calculation.

\* \* \* \* \*